United States Patent [19]

Foulkes

[11] Patent Number: 4,591,294

[45] Date of Patent: May 27, 1986

[54] WELDING AND LAYING PIPELINES

[75] Inventor: Thomas L. Foulkes, Pangbourne, England

[73] Assignee: NIS Engineering Limited, England

[21] Appl. No.: 480,512

[22] Filed: Mar. 30, 1983

[30] Foreign Application Priority Data

Mar. 31, 1982 [GB] United Kingdom ................. 8209496

[51] Int. Cl.⁴ ........................ F16L 1/00; B23K 26/00
[52] U.S. Cl. .............................. 405/170; 219/121 LC; 405/169
[58] Field of Search ............... 405/166, 167, 168, 169, 405/170, 171; 166/355; 219/121 LC, 121 LD; 248/182; 114/264

[56] References Cited

U.S. PATENT DOCUMENTS

| | | | |
|---|---|---|---|
| 2,780,376 | 2/1957 | Sanders | 405/166 X |
| 3,321,925 | 5/1967 | Shaw | 405/166 |
| 3,440,826 | 4/1969 | Kline | 405/166 |
| 3,760,875 | 9/1973 | Busking | 166/355 X |
| 3,860,122 | 1/1975 | Cernosek | 405/166 X |
| 3,919,958 | 11/1975 | Graham et al. | 166/355 X |
| 4,001,543 | 1/1977 | Bove et al. | 219/121 LC |
| 4,068,490 | 1/1978 | Jegousse | 405/166 |
| 4,257,720 | 3/1981 | Ostgaard | 405/224 X |
| 4,413,925 | 11/1983 | Latimer | 114/264 X |

Primary Examiner—Dennis L. Taylor
Attorney, Agent, or Firm—Hall, Myers & Rose

[57] ABSTRACT

A pipe-welding assembly is provided in which single-pass welding of one pipe length to another is accomplished by gas lasers mounted to rotate around the axis of the pipes to weld the pipe ends together in the gap between two axially aligned spaced pipe clamps. Weld-testing units are similarly rotated around the pipe axis. The pipe-welding assembly is mounted on a gyroscopically-stabilized platform, which can be located on a pipe-laying land vehicle, or on a pipe-laying ship for laying pipe lines on the ocean bed. If the ship is equipped with a pipe feed tower, with the pipe-welding assembly positioned at the base of the tower and a drawbridge provided for elevating successive pipe lengths angularly into the tower, pipe laying can be performed in the "J" configuration. If the tower is mounted so that it can be inclined angularly into a position approaching the horizontal, and the pipe-welding assembly can be similarly rotated on its stabilized platform, pipe-laying can be performed in the "S" configuration.

24 Claims, 8 Drawing Figures

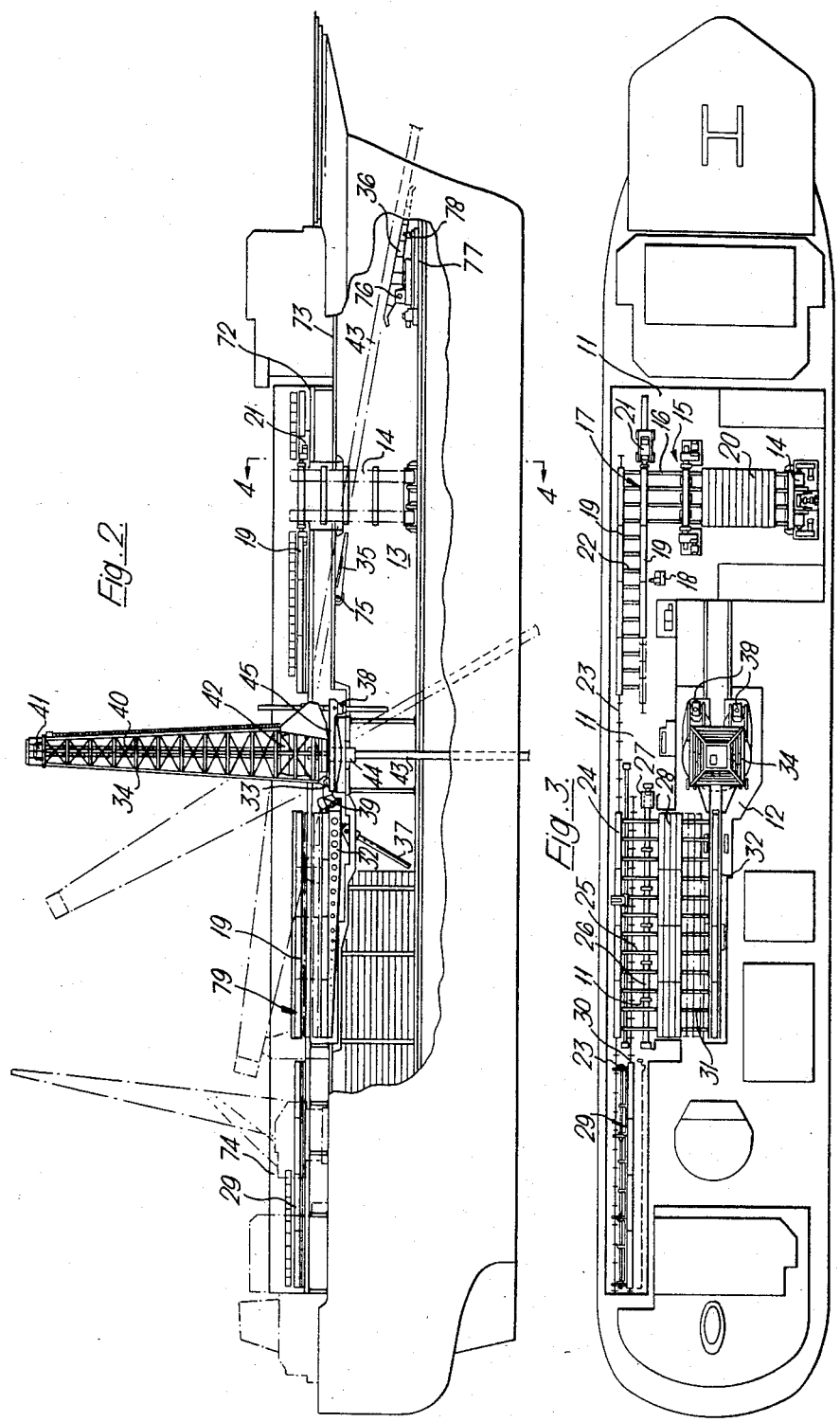

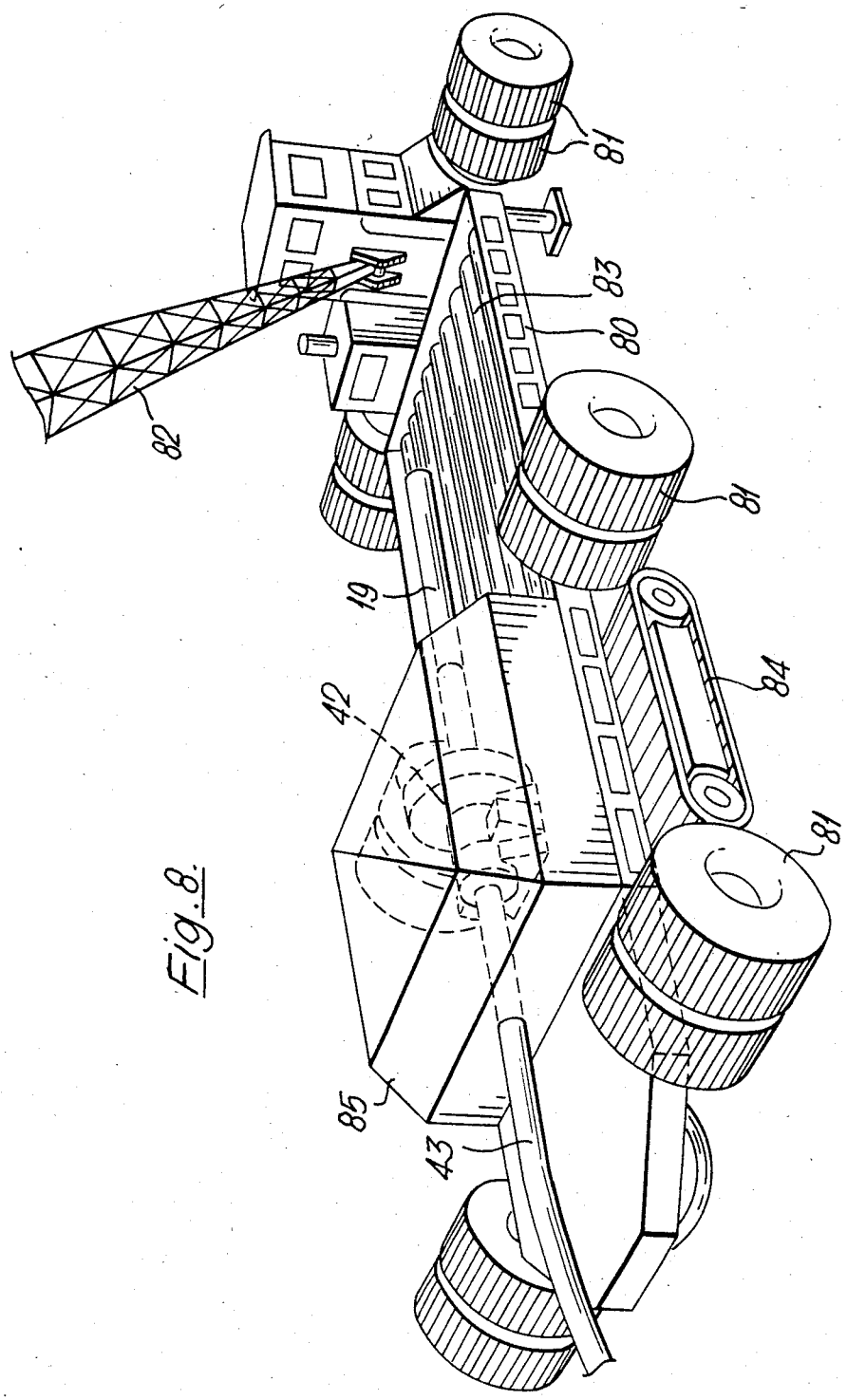

WELDING AND LAYING PIPELINES

This invention relates to the welding and laying of pipelines, both on-shore and at sea.

Conventional techniques in off-shore pipe-laying currently adopt the 'S' curve configuration in which the pipe leaves the laying vessel substantially horizontally. With this configuration it is technically feasible to lay up to 30" diameter pipe-lines in waters to a depth of approximately 1000 meters, i.e. 3,300 feet, but the problems increase as the depth increases. The maximum depth achieved we believe has been 1025 feet of water.

Major practical problems arise at greater depths. The stinger supporting the pipe as it leaves the vessel must be longer, stronger and more buoyant. The necessary horizontal force to prevent pipe buckling increases and it becomes more difficult to create that horizontal force because of the requirements on dynamic positioning of the pipe-laying vessel. It is also necessary to use stronger tensioning machines. More specifically, the suspended pipe in the 'S' configuration has a distinct sag and overbend. To avoid buckling of the pipe as the pipe leaves the ramp and to reduce tensioning forces, the use of a stinger is indispensible, even in shallow water depths. The technical limits of this method for deep water pipe-laying are determined by the stinger size and the necessary horizontal component of force, which must be generated by the propulsion system and transmitted to the pipe by a tensioner.

The technique of the 'J' method, in which the pipe leaves the laying vessel substantially vertically, can be used for laying pipe in deep water. With this system a 34" diameter pipe can be laid in 1200 meters (3950 feet) of water, and a 24" pipe can be laid in 3000 meters (9850 feet) of water. In such instances, a dynamically positioned laying vessel can be used, since only very low horizontal tensions are involved. Sub-surface pipe flotation is unnecessary and the equipment is not so sensitive to sea conditions. The 'J' pipe-laying method therefore has considerable advantages over the conventional 'S' method that is currently used, and it is an object of the present invention to render it economically feasible.

According to one respect of the invention, there is provided a self-contained welding assembly in which single-pass girth welding of pipes is performed by coherent beam energy, and particularly by one or more high power $CO_2$ gas lasers, the whole assembly being mounted on a gyroscopically-stabilised platform.

According to another aspect, the invention provides a pipe-welding assembly mounted on a gyroscopically-stabilised platform, a pipe feed tower also mounted on the platform to support and feed the pipe down the tower for welding and laying, and means for inclining the tower about a pivotal mounting at its base between a vertical or near vertical position in which 'J' configuration pipe-laying can be performed, and a position approaching the horizontal in which 'S' configuration pipe-laying can be performed. A drawbridge may be provided that lies substantially horizontally to receive the pipe lengths one at a time and can be raised about an end pivot on the stabilised platform to lift each pipe length into the pipe feed tower.

High power $CO_2$ lasers provide the rapid welding capability needed to make this variable mode pipe-laying technique economically feasible. Welds with wall thicknesses up to 17/19 mm. on 30" pipe have been undertaken and have met the international API Standard 1104, a complete girth weld being made in a single pass at one station.

In the preferred arrangement, the welding lasers are mounted to rotate around the pipe joint, and non-destructive weld-testing probes can also be mounted on the same rotating assembly, the welds being made and tested in one pass under computer control with substantially instantaneous read-out of the weld quality.

To enable the welding assembly to weld pipes passing through vertically, horizontally or at any intermediate inclination, there is preferably a weld table carrying the welding equipment which is mounted on the stabilised platform for rotation through 90° about a horizontal axis.

Such a welding assembly can be employed not only on a sea-going vessel arranged for pipe-laying in both the 'S' and 'J' configurations but also on a vessel laying pipe only in the 'S' configuration or only in the 'J' configuration. Furthermore, by mounting the assembly on a land vehicle suitable for rough terrain, overland pipe-laying can be carried out.

Arrangements according to the invention will now be described in more detail with reference to the accompanying drawings.

In the drawings:

FIG. 2 is a side elevation of the ship, partly broken away,

FIG. 3 is a plan view of the ship,

FIG. 8 is a pictorial view of a pipe-laying land vehicle according to the invention.

Figure 1:
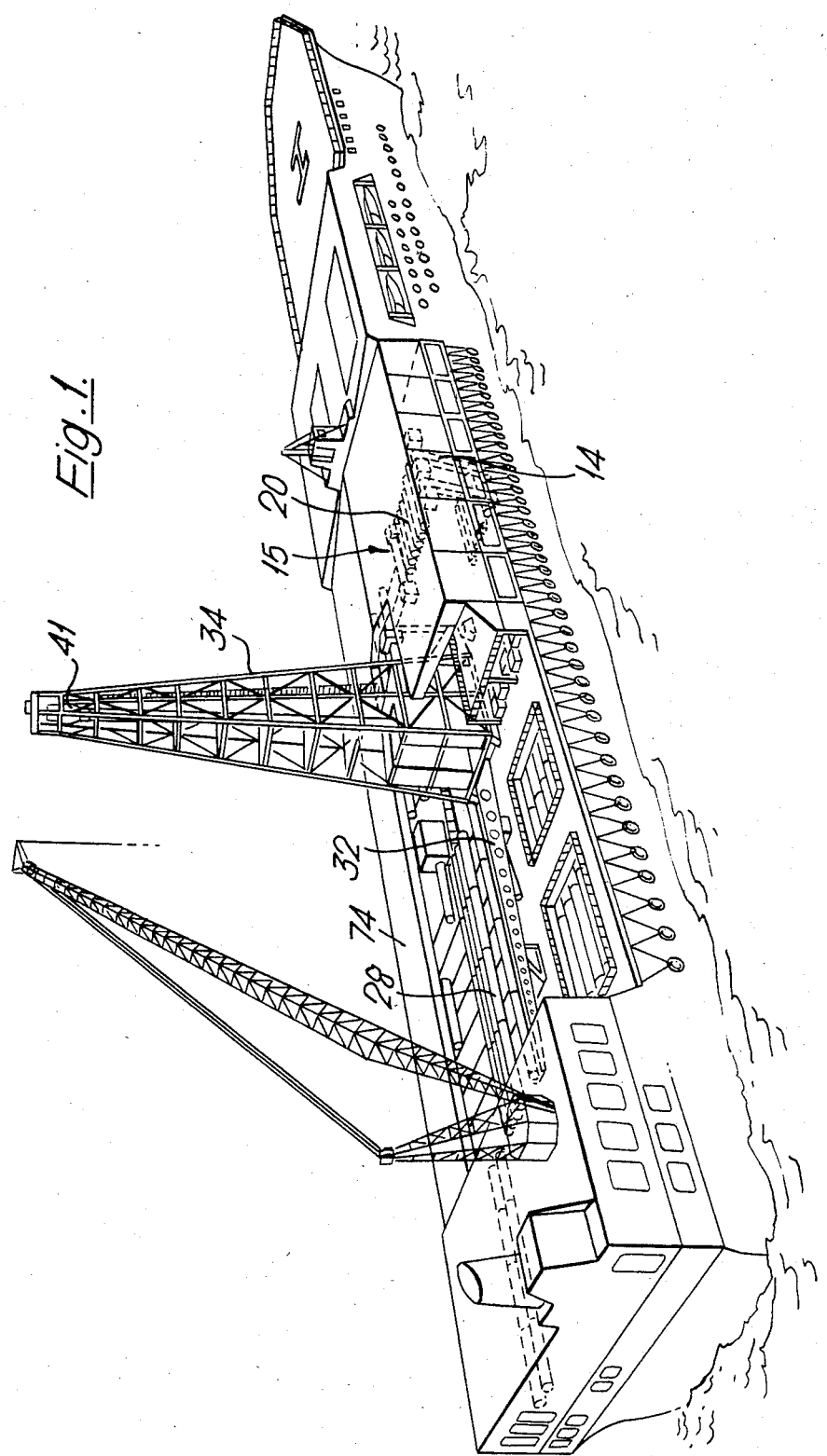
FIG. 1 is a pictorial view of a pipe-laying ship according to the invention.

A deep water pipe-laying vessel is shown in FIGS. 1 to 4. The vessel is of twin-hull catamaran design and has an overall length of approximately 900 feet, a beam of 160 feet and a draught of approximately 30 feet. The vessel has a displacement tonnage of approximately 70,000 tonnes, a pipe-carrying capacity of approximately 25,000 tones and a cruising speed of approximately 20–24 knots.

The ship's deck area is divided into pipe-preparation regions 11 and a pipe-laying region 12. In the pipe-preparation regions, pipes each approximately 40 ft in length withdrawn from a pipe storage hold 13 are elevated mechanically in succession by an elevator 14 to a transfer area 20 through which they are delivered by a walking beam conveyor 16 to a pipe end preparation station 15 where both ends of each pipe are machined true. Each pipe is then fed from the pipe end preparation station 15 across the deck by the walking beam conveyor 16 to a primary welding station 17 at which a $CO_2$ laser 18 welds four sections of pipe end to end making a total pipe length 19 of 160 feet, the pipes being shifted endwise for the welding operation on a roller conveyor by a ram 21. The four-section pipes 19 are then shifted transversely by a walking beam conveyor 22 on to a roller conveyor 23 that conveys each pipe length endwise along the deck to a primary testing station 24 at which X-ray testing of the welded joints takes place. Satisfactory pipe-lengths are transferred transversely by a walking beam conveyor 25 to a coating station 26, at which the pipes are protectively coated by a pipe-coating unit 27, and thence to a storage area 28. Any pipe length that fails in the X-ray testing continues endwise on the roller conveyor 23 to a repair area 29, from where a separate roller conveyor 30 returns it, after repair, to the walking beam conveyor 25 for coating.

From the storage area 28 the pipes descend in succession down a sloping beam conveyor 31 on to a drawbridge 32 which can be raised about a forward end pivot for transferring the pipe to a pipe feed tower 34 whose angle of tilt is infinitely variable about a pivot 33 from 10° to the horizontal up to 90°, i.e. vertical. At an inclination of 10° or somewhat more, pipe-laying can be undertaken in the 'S' configuration in in-shore shallow waters using adjustable stingers 35, 36 designed to accommodate varying angles of inclination and disposed inboard in between the catamaran hulls 10 of the vessel, the whole system being completely automatic. Between vertical and 30° from the vertical pipe-laying from the tower can take place in the 'J' configuration. In consequence, pipe-laying can be undertaken in both deep and shallow waters with the same vessel, and without the need to make expensive off-shore ties.

The drawbridge 32 is raised and lowered by jacking legs 37, and the inclination of the tower 34 is changed by a duplex jacking system 38. Each pipe length arriving on the drawbridge is located endwise by a swing end stop 39 and clamped to the drawbridge by swing arms. On raising of the drawbridge to transfer the pipe to the tower 34, the pipe is received in a central vertical conveyor system 40 in the tower and its upper end is received in a pipe clamp 41 at the top of the tower. The drawbridge clamps are released and the end stop 39 withdrawn, and the drawbridge can then be lowered to receive the next pipe length.

With the tower vertical, the pipe length 19, constrained by the vertical conveyor system 40 of the tower, is suspended from the pipe clamp 41 at the top of the tower directly over a self-contained automatic pipe-welding assembly 42 within the tower base. The pipe clamp 41 also comprises a pipe lowering mechanism which then lowers the pipe 19 vertically until it is within the welding assembly 42, with its lower end ready to be welded to the upper end of the already completed pipeline 43. The completed pipeline 43, leaving the vessel vertically under the tower between the catamaran hulls 10, is clamped near its upper end by a pipeline slip and hold mechanism 44 located centrally below the tower, the terminal end of the thus clamped pipeline 43 lying within the welding assembly 42 ready to be welded to the lower end of the next pipe length 19. The assembly 42 within the base of the tower comprises not only high power $CO_2$ gas lasers to accomplish the welding but also X-ray weld-testing equipment and a pipe coating unit for applying the final protective coating to the welded pipeline joints after the welds have been made and tested. When the weld connection between the upper end of the completed pipeline 43 and the lower end of the next pipe length 19 has been made, the pipe clamping and lowering mechanism 41 lowers the whole pipeline 43 until the new pipeline end lies within the welding assembly 42 ready for connection to the next pipe length. The pipeline slip and hold mechanism 44 then clamps the pipeline, while the clamping and lowering mechanism 41 releases the upper end of the new pipe length 19 and returns to the top of the tower, ready to receive the next pipe length elevated by the drawbridge 32.

The pipe feed tower 34, drawbridge 32, welding assembly 42 and slip and hold mechanism 44 are supported on a computer-linked gyroscopically stabilised platform 45 that remains dynamically level as the vessel moves according to sea conditions, up to Force 8. Therefore, the tower, if vertical, remains vertical and the welding process is unaffected by the motion of the ship. Pipe-laying is possible at a faster rate than by the techniques employed hitherto; a pipe joint can be made approximately every eleven to twelve minutes. Also, the vessel can be reloaded with pipes by lighter barges coming alongside, the fresh pipes being lowered directly into the main holds of the vessel without affecting the laying programme.

Figure 5:
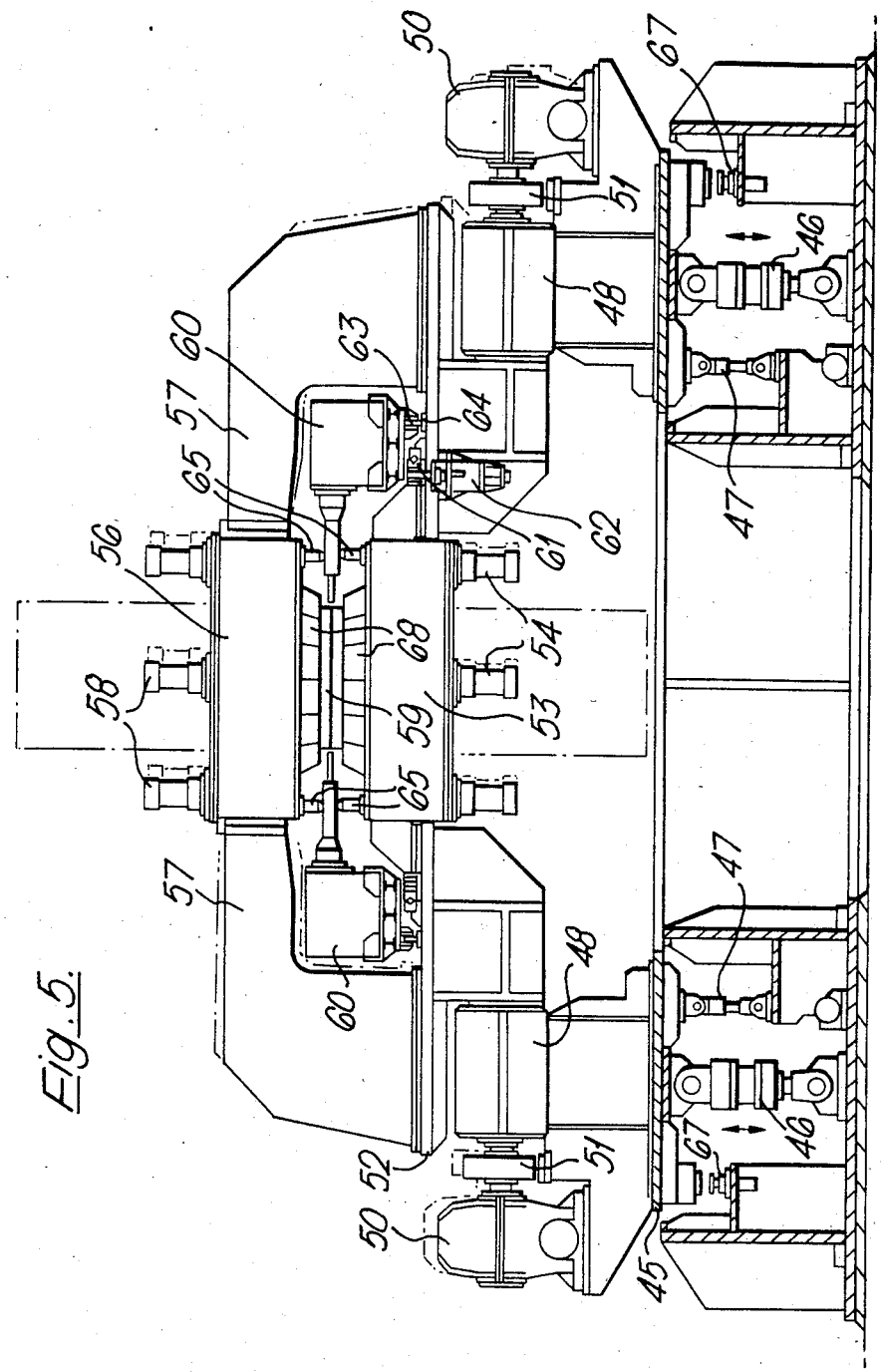
FIG. 5 is a side elevation, partly in section, of a pipe-welding assembly.
Figure 6:
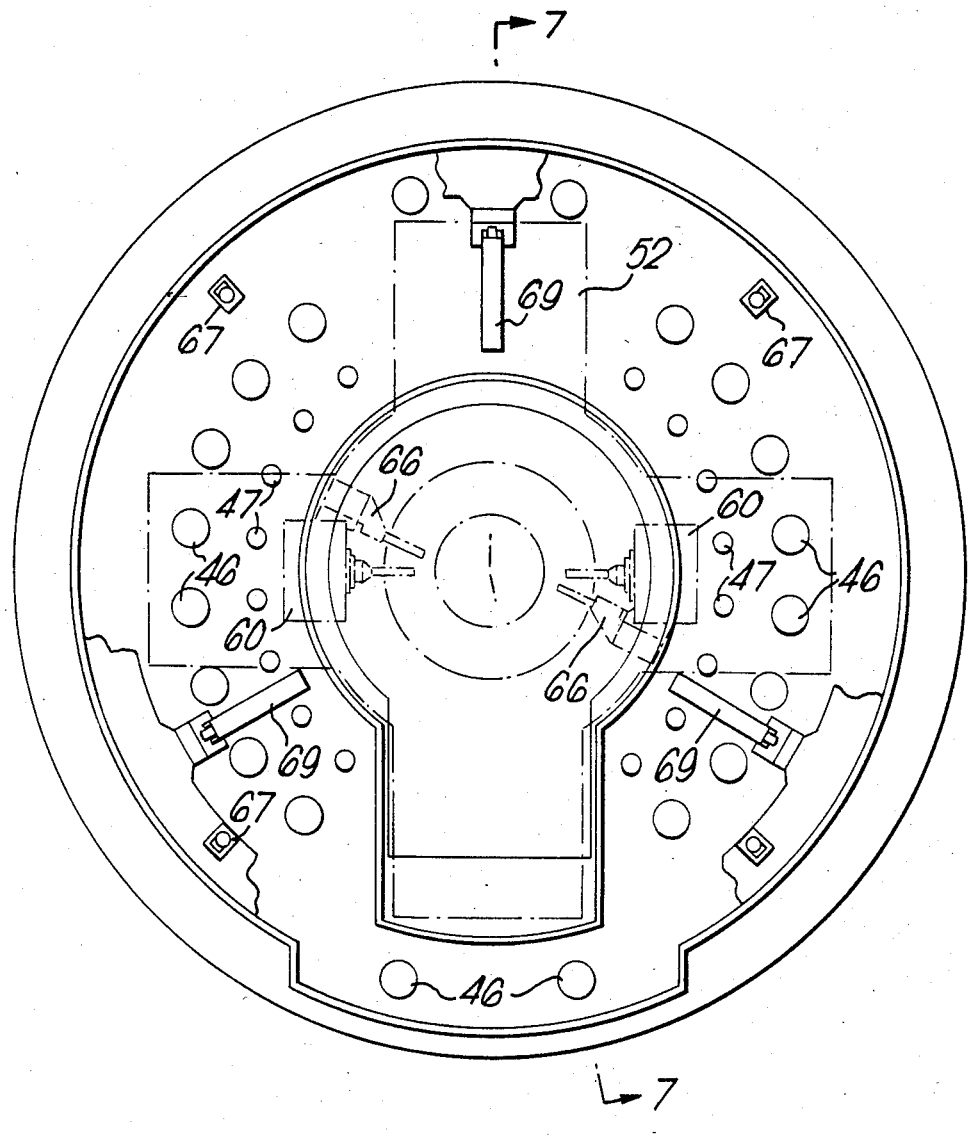
FIG. 6 is a diagrammatic plan of the base of the assembly of FIG. 5.
Figure 7:
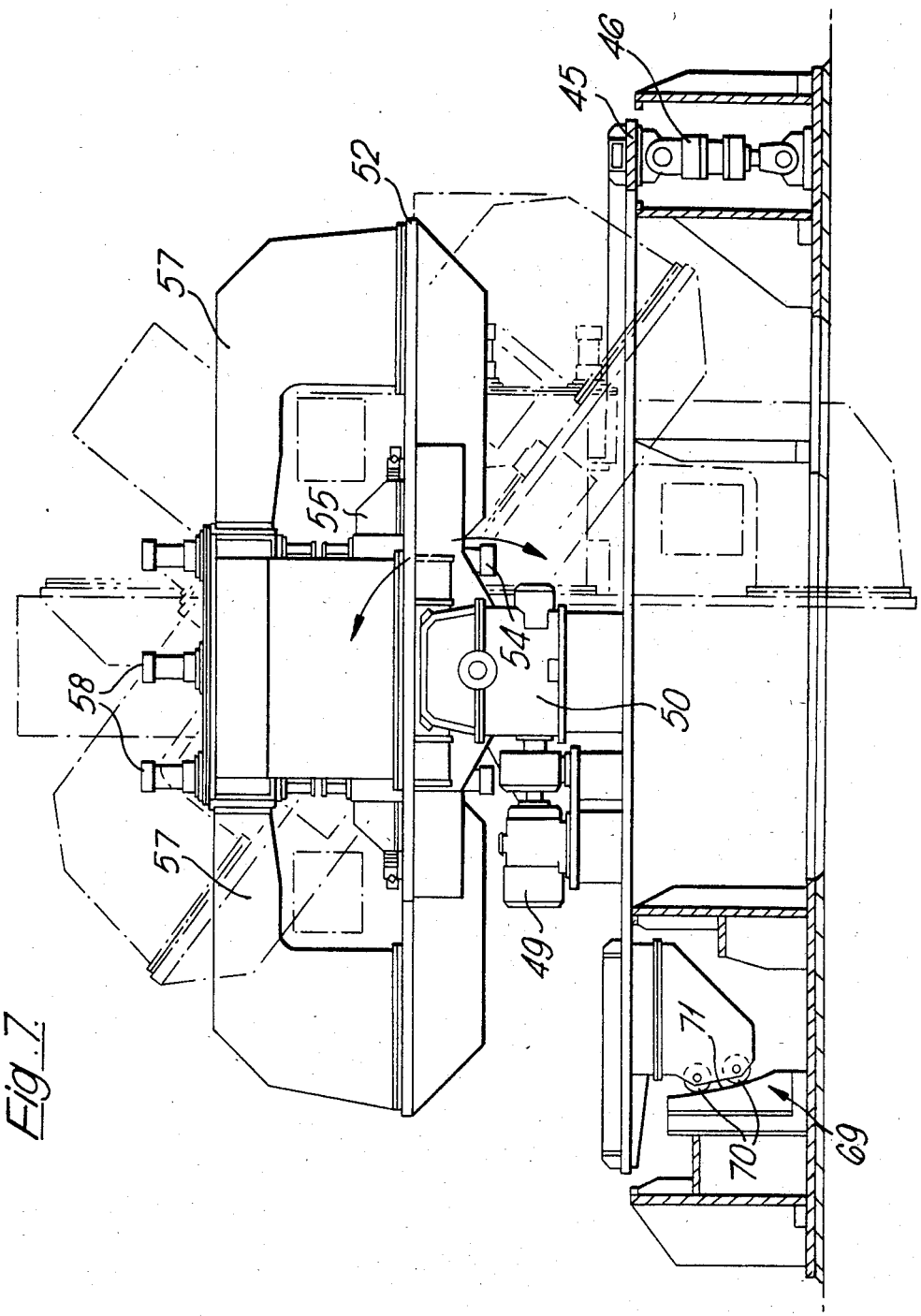
FIG. 7 is a further side elevation of the pipe-welding assembly showing the base in section on the line 7—7 of FIG. 6.

FIGS. 5, 6 and 7 show the welding assembly 42 mounted on the platform 45. The platform 45 is dynamically supported from a deck well by means of a ring of twenty hydraulic piston and-cylinder units 46, sensors 47 being provided to monitor the angular relationship of the platform and the deck. A weld table 52 is mounted on the platform 45 by means of bearings 48 which permit the weld table to rotate about a horizontal axis through 90° to match the inclination of the pipe feed tower. Drive motors 49 acting through worm reduction gearboxes 50 rotate the weld table, hydraulic disc brakes 51 being provided to arrest and hold the table in any chosen angular position.

The weld table 52 has a central aperture in which is disposed a lower pipe clamp 53 supported from the weld table by brackets 55 and operated by hydraulic cylinders 54. In axial alignment with and spaced a short distance above the lower pipe clamp 53, there is an upper pipe clamp 56 carried from the weld table on mounting arms 57 and operated by hydraulic cylinders 58. The pipe ends to be welded are clamped in the upper and lower clamps 56, 53 in such manner that the joint to be welded lies in the gap 59 between the clamps, and the welding is accomplished by two 20 KW $CO_2$ gas lasers 60 diametrically opposed and mounted on the weld table by means of a slew ring 61 that enables them to rotate through 180° around the pipe joint in a plane at right angles to the common axis of the clamps 56, 53. The slew ring is driven by a hydraulic motor 62, and extra support is provided for the lasers 60 by wheels 63 running on a track 64 on the weld table. Annular guides 65 for the laser heads are provided on the pipe clamps 56, 53 to ensure alignment of the lasers with the pipe joint weld line.

Also mounted to rotate with the lasers 60 are two diametrically opposed weld testing heads 66. Normally, the welding of a joint will be accomplished in one 180° pass; but if the test units indicate a weld fault then another welding pass is carried out. Different sizes of pipe can be accommodated by changing the clamping segments 68 in the pipe clamps 56, 53.

To ensure true positioning of the platform during dynamic levelling, three alignment units 69 are provided at 120° intervals around the platform, each consisting of a bracket under the platform carrying rollers 70 that engage a part-spherical guide surface 71 supported in the deck well. In addition, the supporting piston-and-cylinder units 46 are connected at their ends to the platform and the deck, respectively, by spherical joints. Four screw-jacks 67 are provided to lock the platform against movement when necessary, e.g. for maintenance and in sea conditions too rough for pipe-laying.

Figure 4:
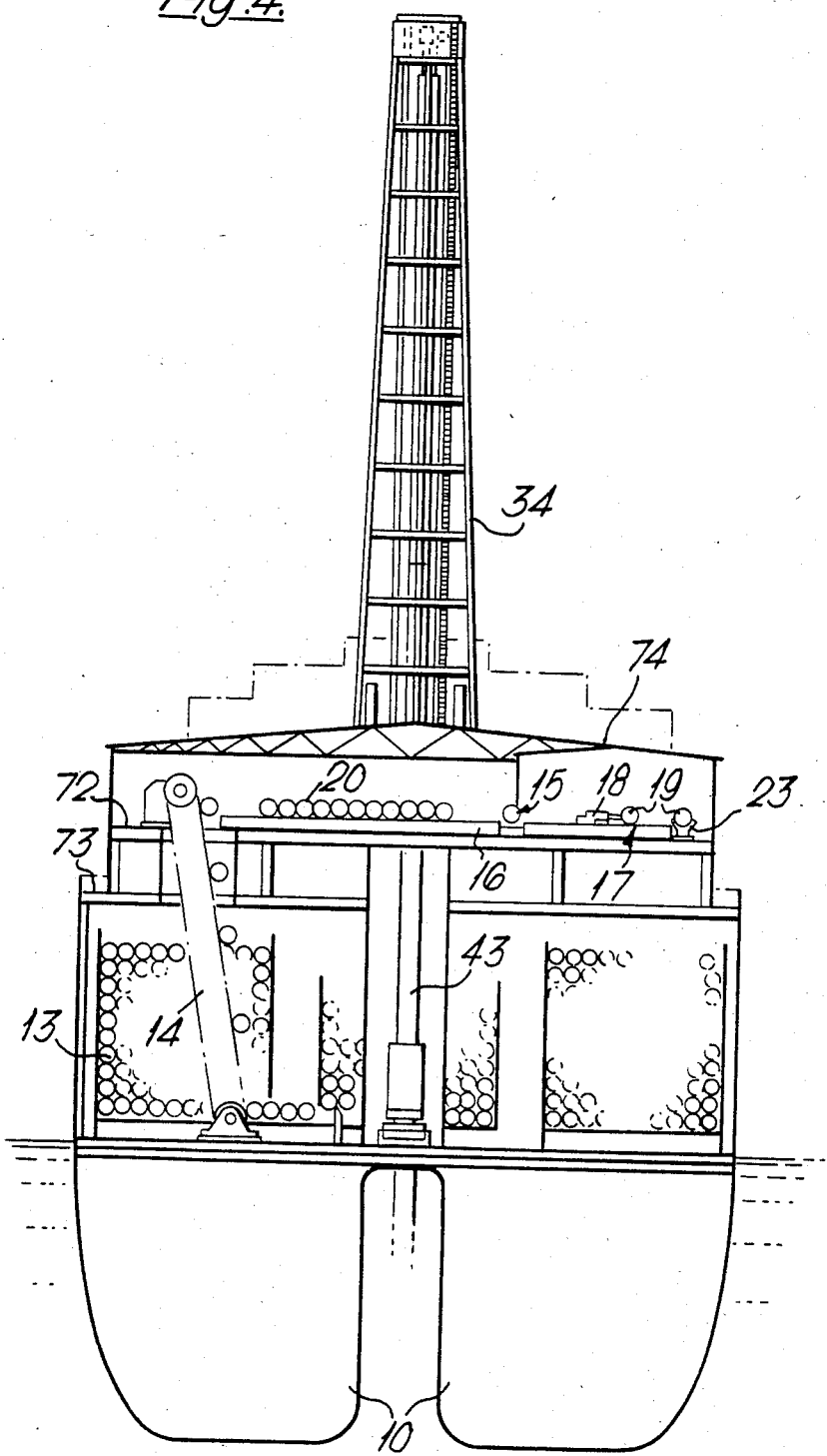
FIG. 4 is a cross-section on the line 4—4 of FIG. 2.

As can be seen in FIGS. 2 to 4, the operations in the regions 11 are carried out on a working deck level 72 above the main deck 73 under cover, these areas being roofed over as at 74. On leaving the covered regions 11 to enter the region 12, which is at main deck level, the pipes 19 pass through a flexible exit door 79 on to the sloping beam conveyor 31.

The stingers 35, 36 used when laying pipe in the 'S' configuration are not only adjustable to suit different tower and pipe inclinations but also are dynamically adjustable automatically to accommodate the motions of the vessel due to sea conditions. One stinger 35 forward of amidships is pivotally mounted under the deck at its aft end, as at 75, for angular movement in the vertical plane. The bow stinger 36 is pivotally mounted at 76 near its aft end, for angular movement in the vertical plane, on a carriage 77 that is able to travel fore and aft along the hold floor, a piston cylinder unit 78 being provided for raising and lowering the forward end of the stinger relatively to the carriage 77.

Since the laser welding assembly 42, on its dynamically stabilised platform, is a self-contained unit, essentially the same assembly can be employed in other situations. Thus, although in the example so far described, the pipe-laying vessel is arranged to lay pipeline in both the 'S' and the 'J' configurations, the same assembly, including, if desired, the tower 34 and the drawbridge 32, can be employed on a vessel designed only for laying pipe in the 'J' configuration at great depths, or a vessel designed only for laying in the 'S' configuration in comparatively shallow waters. It is therefore convenient for the welding assembly on its platform to be readily demountable from the vessel so that it can be employed on a different vessel, e.g. a barge.

The $CO_2$ gas lasers employed are preferably of the type developed at the Culham Laboratory of the United Kingdom Atomic Energy Authority. They have essentially no optics and are brought close to the work to be welded so that there is no significant beam attenuation.

The same welding assembly 42 can indeed also be used in the laying of pipelines on shore. FIG. 8 shows a vehicle for laying pipeline overland in the 'S' configuration, for which purpose the weld table 52 is rotated, relatively to the platform 45, through 90° from the position shown in FIGS. 5 to 7 so as to be able to make welded joints in pipe passing through the welding assembly horizontally. The pipe-laying vehicle is essentially a large flat truck 80 supported on large-diameter wide-tired twin wheels 81 at its front and rear ends and also at the centre. The wheel sets have independent suspensions such as to enable the vehicle to traverse difficult terrain, and are independently hydraulically driven and steered. At the front of the vehicle there is a control room housing generators, with a crane 82 alongside, embodying a motion-compensating system, for loading pipe lengths from transport trucks on to a pipe storage area 83 of the vehicle immediately behind the crane. From this storage area, the pipe lengths are fed to the welding assembly 42, which is mounted toward the rear of the vehicle. Assistance over difficult terrain is given by crawler tracks 84 underneath the region of the vehicle that carries the welding assembly, which tracks can be raised out of contact with the ground when not required.

As before, the platform of the welding assembly is gyroscopically levelled so that the motions of the vehicle do not adversely affect the pipe-laying operation. The area of the vehicle occupied by the welding assembly 42 is roofed over, as at 85, so that the welding is performed under cover. In this instance, on completion of a welded joint, the whole vehicle moves forward a sufficient distance to bring the next joint to be welded into the welding assembly.

As in the case of the ship-borne system, the welding and pipe-laying can be fully automatic and computer-controlled. Changes in pipe diameter can be quickly accommodated, and consistent weld quality is achieved. The computer read-out gives substantially immediate indication of the weld quality, and if any fault shows up it can quickly be removed by the performance of a second welding pass. Many modifications of the arrangements described are, of course, possible without departing from the scope of the invention. Thus, different numbers of welding lasers can be employed, and in a welding assembly intended for work largely or wholly on horizontal pipe laid in the 'S' configuration, it may be preferred to mount the lasers for rotation around the joints on a "ferris wheel" assembly, instead of in the manner shown in FIGS. 5 to 7. Air suspension, instead of hydraulic suspension, can be employed for the welding platform. And the X-ray weld-testing probes may be replaced, or supplemented, by ultrasonic or other types of non-destructive test probe, if desired.

When laying pipeline in cold conditions, a pre-heating facility can be employed to warm the pipes to an acceptable temperature prior to welding. Facilities for grit-blasting the pipes prior to application of the protective coating can also be provided.

I claim:

1. A high powered pipe-welding assembly mounted on a travelling pipe-laying vehicle for welding one pipe length to another in a single pass, comprising:
    a deck structure being part of the vehicle;
    a welding platform;
    dynamic platform-mounting means mounting said welding platform on said deck structure for universal rocking of said welding platform with respect to said deck structure, said platform-mounting means being operable to rock said welding platform selectively in any direction;
    gyroscopically-controlled stabilizing means on said vehicle connected to operate said platform-mounting means and rock said platform on said deck structure to keep said welding platform always substantially horizontally level irrespective of tilting of said deck structure;
    at least one pipe-welding head mounted on said welding platform; and
    pipe-feeding means on said vehicle to feed pipe lengths carried by the vehicle to said welding head on said welding platform in succession to be welded end to end to form a continuous pipe.

2. The combination according to claim 1, wherein said pipe-feeding means includes a pipe-feeding tower upstanding from said welding platform, and means on said tower to support and feed pipe down the tower past the welding head on the platform for welding and subsequent laying, tower-mounting means being provided for mounting said tower on said platform which tower-mounting means comprise a horizontal axis pivotal connection between the base of the tower and the platform and jacking means connected between the tower and the platform to tilt the tower about said pivotal connection from a substantially vertical attitude in which "J"

configuration pipe-laying is is performed to an attitude approaching the horizontal in which "S" configuration pipe-laying is performed.

3. The combination according to claim 2, wherein said pipe-feeding means further includes a drawbridge that lies substantially horizontally on said deck structure and has one end connected to said deck structure by a horizontal axis pivotal connection adjacent said welding platform, means to feed pipe lengths one at a time on to said drawbridge, pipe-locating means on said drawbridge to hold each pipe length fed thereonto, and means for raising said drawbridge about said pivotal connection at said one end thereof to lift each pipe length located thereon up to said tower for transfer to said tower.

4. The combination according to claim 3, wherein the pipe feed tower is provided at its upper end with pipe clamping and lowering means to receive the upper end of a pipe length lifted into the tower by the drawbridge.

5. The combination according to claim 4, wherein the drawbridge has pipe clamping and end stop means which are withdrawn from each pipe length after it has been lifted into the tower and its upper end clamped by said pipe clamping and lowering means on the tower.

6. The combination according to claim 4, wherein the tower also comprises conveyor means for guiding each pipe length endwise down the tower to the pipe-welding head.

7. The combination according to claim 4, further comprising a pipe slip and hold mechanism mounted on the platform under the tower and below the pipe-welding head, to hold the last pipe length of the already completed portion of the pipe line so that its end lies at the pipe-welding head for welding to the lower end of a fresh pipe length held in the tower.

8. The combination according to claim 2, wherein the pipe-welding head comprises two axially aligned pipe clamps, separated by a gap, to hold the two pipe ends to be joined, and at least one laser mounted to rotate around the clamped pipe ends and weld them together in the gap between the clamps.

9. The combination according to claim 8, wherein the clamps and the welding laser are mounted on a welding table, having a central aperture for the pipe, that is rotatable relatively to the welding platform about a horizontal axis to match the angular inclination of the tower.

10. The combination according to claim 8, wherein the welding laser is a $CO_2$ gas laser.

11. The combination according to claim 8, wherein the pipe-welding head includes at least one weld-testing unit rotatable around the welded pipe ends.

12. The combination according to claim 11, further comprising pipe-coating means on the vehicle to apply a protective coating to the welded pipe after testing of the welds.

13. The combination according to claim 3, wherein the vehicle is a ship and having a covered deck upon which pipe-length preparing operations are performed, upon pipes elevated from the ship's hold, the prepared pipe lengths being fed one by one to the drawbridge.

14. The combination according to claim 13, wherein the ship is constituted as a twin-hulled catamaran, the welded pipe being laid between the hulls.

15. The combination according to claim 13, wherein to guide the welded pipe being laid the ship has stingers that are adjustable to accommodate different inclinations of the pipe feed tower.

16. The combination according to claim 1, wherein the welding head comprises a pair of axially aligned spaced pipe clamps to clamp the ends of pipes to be welded, and an assembly of gas lasers and weld-testing units rotatable around the pipe axis to weld the pipe ends together in the space between the clamps and test the resulting weld.

17. The combination according to claim 16, wherein the pipe clamps and the rotatable assembly of lasers and weld-testing units are mounted on a weld table that is itself rotatable with respect to the stabilised platform about a horizontal axis, the weld table having a central aperture for the pipe.

18. The combination according to claim 16, wherein the mounting means for the stabilised platform comprises part-spherical guides and a plurality of piston-and-cylinder units.

19. The combination according to claim 16 wherein the vehicle is a land vehicle.

20. A pipe-welding assembly comprising a platform, two axially-aligned spaced pipe clamping means mounted on said platform with a gap therebetween to hold two pipe lengths with their ends in juxtaposition in the gap for welding, and at least one laser welding head mounted on said platform to rotate about the axis of said pipe lengths held in said clamping means with the laser beam constantly directed into said gap between said clamping means to produce an annular weld joining said pipe lengths.

21. The assembly according to claim 20, further comprising a weld table rotatably mounted on said platform to rotate about a horizontal axis, said pipe-clamping means and said laser welding head being mounted on said weld table to rotate therewith.

22. The assembly according to claim 20, comprising an angularly spaced plurality of laser welding heads to rotate about said axis thereby to produce a complete annular weld in less than one complete rotation.

23. The assembly according to claim 22, further comprising weld-testing units mounted to rotate with said laser welding heads.

24. The assembly according to claim 22, wherein the laser heads are $CO_2$ gas lasers.

* * * * *